April 25, 1967 S. C. LOCKHART 3,315,888

WHEEL REVOLUTION COUNTER

Filed Nov. 26, 1965 2 Sheets-Sheet 1

INVENTOR.
STANFORD C. LOCKHART
BY
J.B. Holden
ATTORNEY

April 25, 1967  S. C. LOCKHART  3,315,888

WHEEL REVOLUTION COUNTER

Filed Nov. 26, 1965  2 Sheets-Sheet 2

INVENTOR.
STANFORD C. LOCKHART

BY

*J.B. Holden*
ATTORNEY

United States Patent Office

3,315,888
Patented Apr. 25, 1967

3,315,888
WHEEL REVOLUTION COUNTER
Stanford C. Lockhart, Akron, Ohio, assignor to The Goodyear Tire & Rubber Company, Akron, Ohio, a corporation of Ohio
Filed Nov. 26, 1965, Ser. No. 509,765
2 Claims. (Cl. 235—95)

This invention relates to a wheel revolution counter assembly, and, more particularly, to a spring clutch driven counter mechanism which is readily adaptable for attachment to a hub cap removably positioned upon a rotatable wheel.

It is the general object of the invention to provide a wheel revolution counter assembly which can be easily secured to a rotatable wheel wherein the counter mechanism of the assembly is driven by a one-way spring clutch which is associated with an output shaft of a reduction gearing unit of the assembly.

Figure 1:
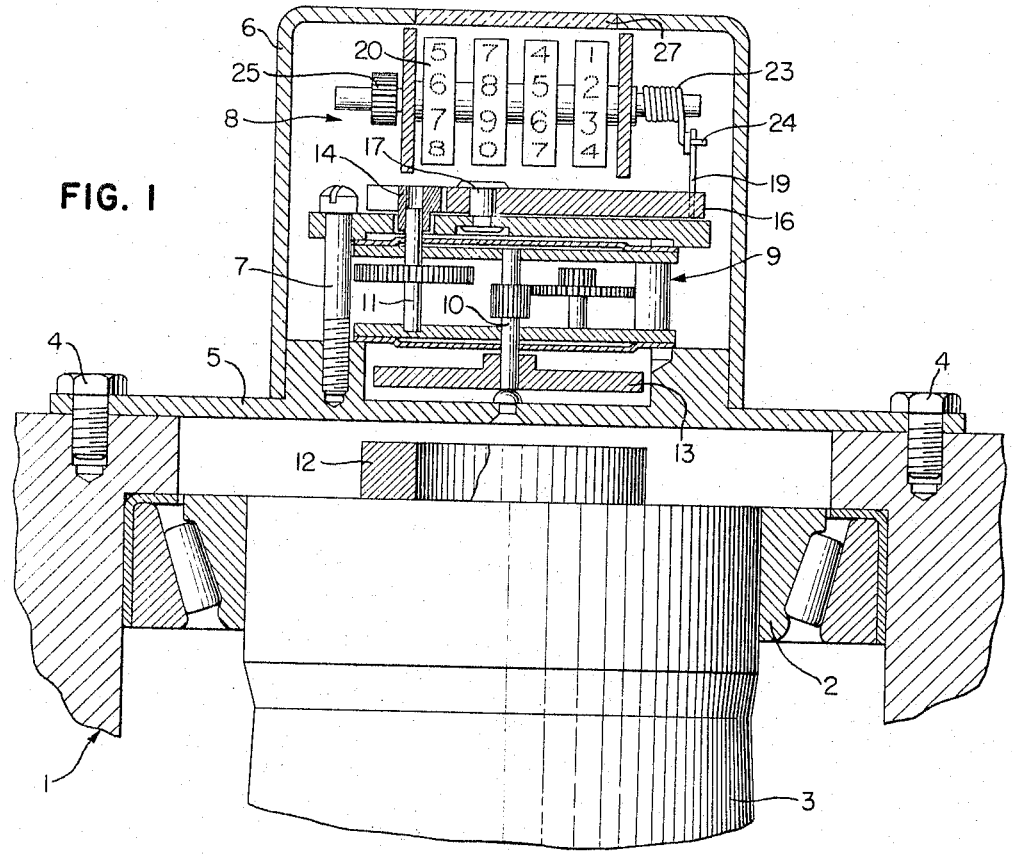
FIGURE 1 is a horizontal, diametric, cross sectional view, partially broken away, taken substantially along line 1—1 of FIGURE 2, and illustrating the preferred embodiment of the apparatus of the invention.

In the drawings, and particularly FIGURE 1, a wheel 1 is rotatably mounted by bearings 2 on a fixed axle 3. Removably affixed by bolts 4 to the wheel 1 is a plate or hub cap 5 of non-magnetic material. A cover 6 is suitably secured to the hub cap 5, as by screws.

Contained within the cover 6 and operatively mounted to the hub cap 5 by cap screws 7 is a counter assembly which is generally indicated by the numeral 8. A suitable gear reducer 9 is included in the counter assembly. The gear reducer 9 has an input shaft 10, and an output shaft 11, the revolutions of the output shaft being reduced in proportion to the revolutions of the input shaft by the gearing of the reducer in known fashion. Mounted in fixed relation on the axle 3 is a magnetized ring 12 which acts to hold in substantially fixed relation, without mechanical interlocking, a magnetizable bar 13 which is secured to the end of the input shaft 10. This combination, disclosed in United States Patent No. 3,233,828, effects a drive of the input shaft 10 because as the wheel 1 rotates about the fixed axle 3 the magnetic bar 13 and the input shaft 10 are held in fixed relation relative to the balance of the counter assembly unit which is rotating with the wheel.

Figure 2:
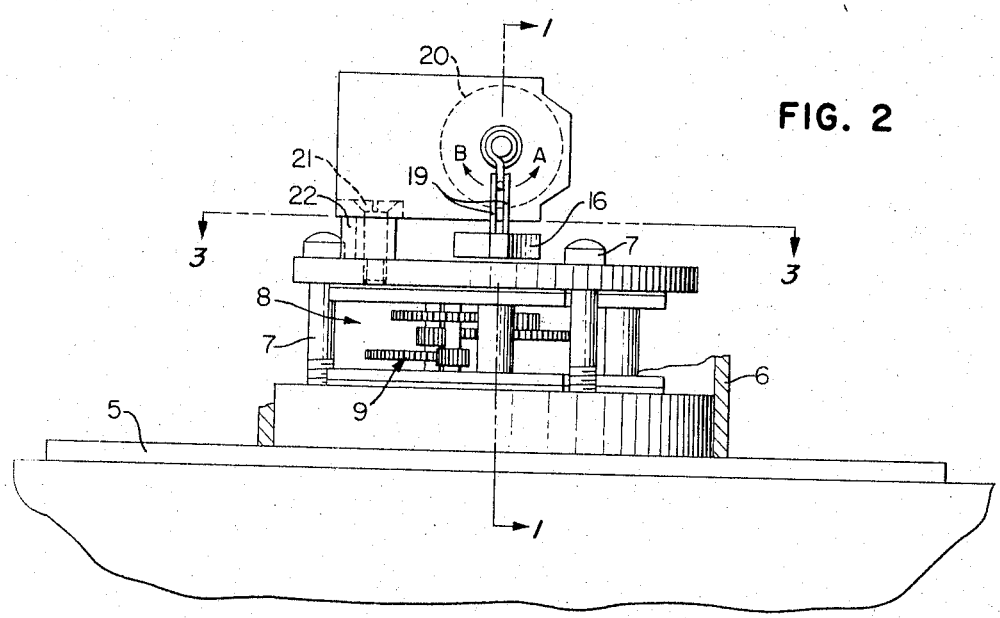
FIGURE 2 is an end elevation of the apparatus illustrated in FIGURE 1.
Figure 3:
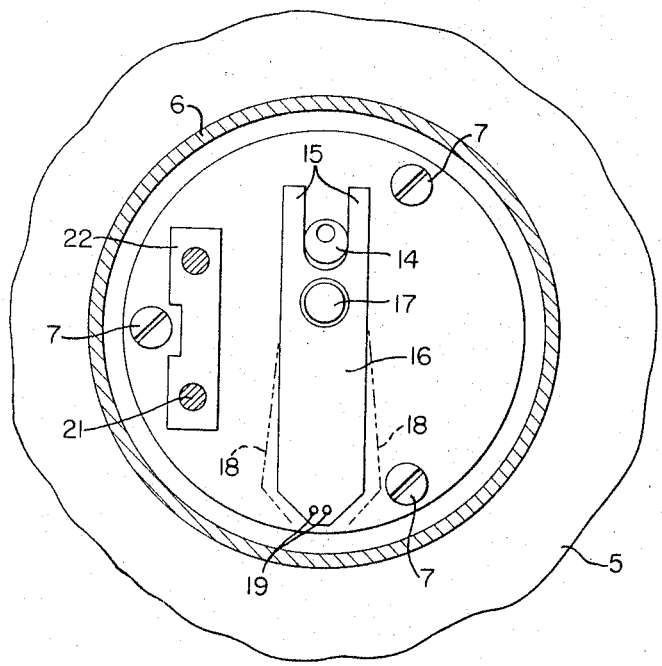
FIGURE 3 is a sectional view, as seen on line 3—3 of FIGURE 2, illustrating the driving components of the counter mechanism.

Mounted on the end of the output shaft 11 is an eccentric 14, which is received between the fork legs 15 of a walking beam 16, this being best indicated by FIGURE 3. The walking beam 16 is pivotally mounted on the gear reducer 9 by means of a pivot pin 17. Thus, when the eccentric is revolved by the output shaft 11, the walking beam oscillates in its own plane to the extent of the dotted lines 18 in FIGURE 3. Mounted at right angles on the end of the walking beam 16 opposite the legs 15 are a pair of pins 19, best illustrated by FIGURE 2. The purpose of such pins 19 is to effect a drive to the spring clutch of the counter as will become evident hereinafter.

A standard counter 20, such as a counting device known under the registered trademark "Veeder," is secured to the gear reducer by suitable screws 21 extending through a spacer block 22. Slidably received by the driving shaft of the counter 20 is a spring clutch 23. The end 24 of the spring clutch 23 is bent at right angles and is received between the pins 19 of walking beam 16 in a manner best illustrated by FIGURE 1. The spring clutch 23, acting through the motion imparted to it by the walking pin 16, functions to drive the shaft of the counter 20 only in the direction of arrow A in FIGURE 2. This achieves the important result that the wheel revolution counter assembly is driven in the direction of arrow A regardless of the direction of rotation of the wheel to which the assembly is attached. The spring clutch 23 alternately tightens, driving the shaft of the counter when the pins 19 move in the direction of arrow A, and loosens, not driving the shaft of the counter when the pins 19 move in the direction of arrow B.

Figure 4:
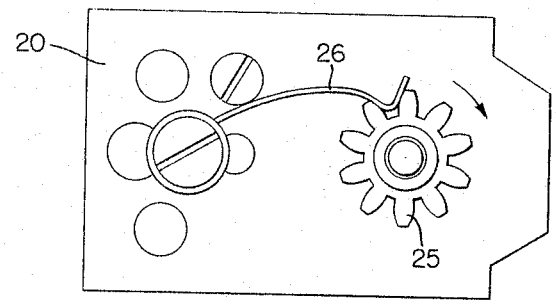
FIGURE 4 is an enlarged end elevation, particularly illustrating the ratchet and detent spring incorporated in the wheel revolution counter assembly.

A detent pinion 25, best illustrated by FIG. 4 is rotatably secured to the end of the drive shaft opposite the end on which the spring clutch is slidably received. A detent spring 26 is adapted to work in correlation with the detent pinion 25 wherein the spring and detent pinion resist movement of the shaft in the counter while the pins 19 and the end 24 of the spring clutch move in the direction indicated by arrow B but yield to allow rotation of the shaft upon movement of the pins 19 in the direction of arrow A. The detent pinion 25 and detent spring 26 also serve to correct for slight amounts of over-travel and under-travel when the pins and end of the spring clutch are reciprocated in the direction of arrow A. In other words, the detent pinion 25 has ten teeth and each disc of the counter 20 has ten digits, hence, each complete cycle of the one oscillation of the walking beam advances the counter one digit. This represents exactly one-hundred revolutions or one-thousand revolutions of the wheel (depending on the ratio of the gear reducer) and no more or no less. A suitable glass or plastic window 27 is placed in the cover 6 to permit viewing of the digits on the counter 20 in order to determine the number of revolutions of the wheel that have occurred.

Although in accordance with the patent statutes, only one best known embodiment of the invention has been illustrated and described in detail, it is to be particularly understood that the invention is not limited thereto or thereby, but that the inventive scope is defined in the appended claims.

What is claimed is:
1. A wheel revolution counter assembly operatively carried by the hub of a wheel and including
    a counter mechanism,
    a drive shaft for said counter mechanism,
    a gear reducer having an input shaft adapted to be driven correspondingly relative to a revolution of the wheel and an output shaft rotating about its axis at a proportionally smaller rate than the input shaft,
    a helically coiled spring having two ends slidably positioned on the drive shaft of the counter with one end thereof in close spaced adjacent relation to the shaft, and the other end thereof bent away in spaced parallel relation to the axis of the shaft,
    elongated flat walking beam means having a U-shaped opening in one end thereof pivotally mounted at about the center thereof to said counter mechanism, the longitudinal axis of said bar means being spaced from and substantially parallel to the drive shaft of said counter mechanism,
    a cam eccentrically mounted to the end of the output shaft of the gear reducer and fitting into the U-shaped opening of the walking beam means to effect reciprocaiton thereof upon rotation of the output shaft,
    a pair of spaced parallel pins mounted substantially perpendicular to said bar means on the end thereof opposite the U-shaped opening which pins re- ceive the other end of said spring extending therebetween whereby reciprocation of said walking beam means effects a rotative drive of said spring which rotation in one direction wraps onto the drive shaft of the counter to effect rotation thereof and rotation in the other direction unwraps from the drive shaft of said counter so no rotation thereof occurs.

2. A wheel revolution counter assembly according to claim 1 including pawl and ratchet means mounted on the end of the counter mechanism drive shaft opposite the spring clutch means wherein a complete cycle of one reciprocation of the walking beam advances the counter mechanism one digit.

References Cited by the Examiner

UNITED STATES PATENTS

| | | | |
|---|---|---|---|
| 1,368,504 | 2/1921 | Karich | 235—95.2 X |
| 1,807,163 | 5/1931 | Mills | 235—95.2 |
| 2,595,213 | 4/1952 | Raynor | 74—126 |
| 3,198,430 | 8/1965 | Hermann | 235—95 |
| 3,233,828 | 2/1966 | Curl et al. | 235—95.2 |

FOREIGN PATENTS 216,375  5/1924  Great Britain.

RICHARD B. WILKINSON, *Primary Examiner.*

T. J. ANDERSON, *Assistant Examiner.*